Figure 1:
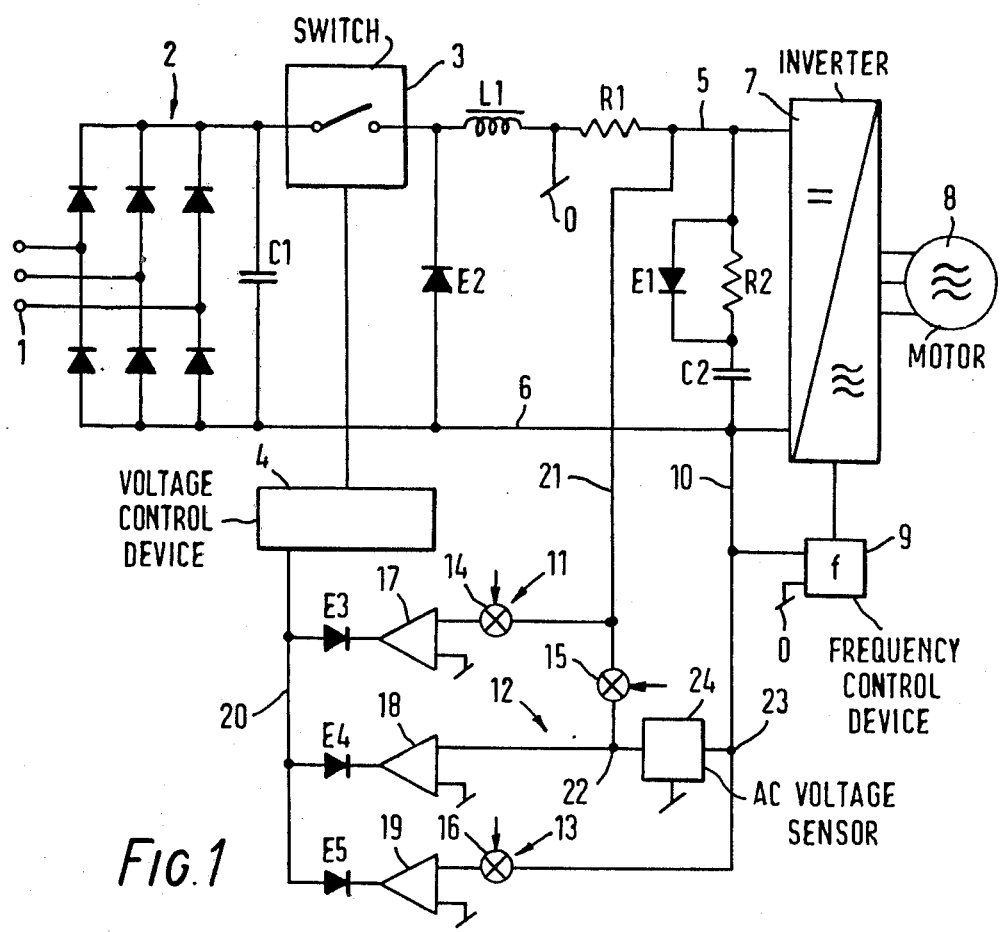

United States Patent [19]

Beierholm et al.

[11] 3,986,100
[45] Oct. 12, 1976

[54] DC-VOLTAGE SUPPLY MEANS FOR AN INVERTER

[75] Inventors: Hans Mogens Beierholm, Augustenborg; Niels Juul Henriksen, Nordborg, both of Denmark

[73] Assignee: Danfoss A/S, Nordborg, Denmark

[22] Filed: Dec. 12, 1974

[21] Appl. No.: 531,982

[30] Foreign Application Priority Data
Dec. 13, 1973 Germany............................ 2361924

[52] U.S. Cl.................................. 323/17; 321/2; 321/10; 321/19; 323/20; 323/DIG. 1
[51] Int. Cl.²............................................ H02P 7/44
[58] Field of Search................. 321/2, 9 R, 9 A, 10, 321/18, 19; 323/4, 9, 17, 20, 22 T, 22 SC, DIG. 1; 318/341, 344, 345

[56] References Cited
UNITED STATES PATENTS

| | | |
|---|---|---|
| 3,305,767 | 2/1967 | Beihl et al..................... 323/DIG. 1 |
| 3,320,512 | 5/1967 | Kruger............................ 323/DIG. 1 |
| 3,353,080 | 11/1967 | Santelmann ...................... 321/10 X |
| 3,585,491 | 6/1971 | Petersen ......................... 323/DIG. 1 |
| 3,600,663 | 8/1971 | Wagner............................... 321/10 |
| 3,772,588 | 11/1973 | Kelly et al............................ 323/17 |

*Primary Examiner*—A. D. Pellinen

[57] ABSTRACT

A control circuit for controlling a supply of D.C. voltage to the input of an inverter. The circuit includes a control arrangement and apparatus for adjusting the D.C. voltage supply in accordance with signals applied to the control arrangement. The circuit also includes a current sensor for sensing the current supplied to the inverter, a sensing device for an A.C. voltage component connected across the input to the inverter, and apparatus for applying signals to the control arrangement in accordance with the current sensed by the sensor and the A.C. voltage component sensed by the sensing device.

10 Claims, 3 Drawing Figures

DC-VOLTAGE SUPPLY MEANS FOR AN INVERTER

The invention relates to a control circuit arrangement for a DC-voltage supply means for an inverter loaded by a motor, which supply means has an electronic on-off switch with a downstream or output filter circuit, the voltage of the DC-voltage supply means being adjustable by at least one control element in dependence upon a current sensor, e.g. a current-measuring resistor provided in one DC lead running to the inverter.

In a known control circuit arrangement the voltage is kept constant at an adjustable value between the DC leads running to the inverter. For this purpose a voltage control signal is derived from this voltage. This signal is compared with a set value. If the actual value differs from the required value the DC-voltage supply means is adjusted accordingly. The DC-voltage supply means is fed with a constant DC voltage and has an electronic on-off switch which lets through DC pulses of constant amplitude which are smoothed to the required DC voltage by a downstream filter circuit which has at least a series choke and a parallel capacitor. The frequency of the inverter is adjusted proportionally to the actual value of this DC voltage.

According to German Pat. Specification OS No. 1 713 775, the voltage and frequency can be additionally influenced in order to bring about starting-up and/or slip compensation.

German Pat. Specification AS No. 1 638 009 discloses the idea of inserting a current-measuring resistor in a DC lead running to the inverter and of deriving, from the voltage-drop occurring at the resistor, a current-control signal which acts upon a control element in such manner that when a maximum value for the current is exceeded, the voltage of the DC-voltage supply means is downwardly adjusted to such an extend as to prevent the occurrence of harmful excess currents. For this purpose, the electronic switch of the DC-voltage supply means can be so adjusted that not only is the length of the pulse varied, but also its frequency.

The object of the present invention is to provide a control circuit arrangement for the DC-voltage supply means of an inverter which permits operation of the motor with constant torque.

According to the invention and proceeding from the initially described control circuit arrangement, this object is achieved in that the DC-voltage supply means is adjustable by keeping the operating current supplied to the inverter constant, by connecting a sensing device, for detecting an AC-voltage component, between the two DC leads of the inverter, and by providing a first control element which, when the sensing device responds, alters the voltage provided by the DC-voltage supply means, the constant current adjustment being overridden.

If the voltage supply means is so adjusted that it provides a constant current and can therefore be regarded as a constant current generator, the motor turns with constant torque, the frequency generally being readjusted proportionally to the voltage. The adjusting circuit, which consists of the DC-voltage supply means, the invertor and the motor, operates in a largely stable manner. However, if any trouble or change occurs in the adjusting circuit, e.g. when there is a sudden change in the load of the motor, the adjusting circuit becomes unstable and oscillations occur which are revealed by fluctuations in the speed of the motor. This is particularly the case when the motor is operating in the supersynchronous range. The amplitude and frequency of the fluctuations are determined by the components of the control circuit, for example the amplifier, filter circuit, motor or load.

It has been found that the oscillations in the control circuit lead to an AC-voltage component between the two DC leads. The frequency of this AC-voltage component is approximately constant and is in the order of magnitude of the resonance frequency of the filter circuit. Although the amplitude of the oscillations can be kept low by heavy damping in the filter circuit, this solution is very uneconomical since the power losses are correspondingly high.

According to the invention, the presence of an AC-voltage component is detected by a sensing device. If this component is present, then the first control element operates to counteract the AC-voltage component. When the voltage between the two DC voltage leads rises, the voltage of the DC-voltage supply means is adjusted to a lower value, and when the voltage between the DC leads drops, it is adjusted to a higher value. Although this results in constant current adjustment no longer taking place during this time, the control circuit is very rapidly returned to a stable condition. As soon as the sensing device no longer detects any AC-voltage component, the constant current adjustment becomes fully operative again.

Particular advantage accrues if the sensing device is a band-pass filter. This band-pass filter is ineffective with DC voltage, but reacts selectively within a certain frequency range and should be so designed that it reacts at a frequency in the order of magnitude of the resonance frequency of the filter circuit.

If the band-pass filter has a low-pass filter and a high-pass filter connected in series, this ensures that, on the one hand, DC voltage cannot pass through it, and on the other hand, that it does not react either in response to the normal slight voltage ripple or to commutation pulses or at high frequencies such as may occur during certain switching operations (switching-on and the like).

A particularly simple switching arrangement is obtained if the first control element can, in the normal case, be influenced in such manner by a control current signal derived from the voltage-drop at the current-measuring resistor, and by a reference voltage, that an adjustable operating current is kept constant and that, when the sensing device reacts, the current-control signal is modified by the signal allowed to pass through the sensing device. A single control device then suffices both to keep the operating current constant and to correct the voltage when instability occurs.

In a preferred arrangement one of the measuring points of the current-measuring resistor and, by way of the band-pass filter, the other DC lead running to the inverter are connected to input of the first control element, and a common reference point is provided for the control element, the other measuring point of the current-measuring resistor and the band-pass filter. In this way the various components can be interconnected with a minimum of expense and trouble.

Furthermore, a second control element can be connected in parallel with the first control element, which second control element can be so influenced, independently of the sensing device, that an adjustable maximum current is not exceeded, the second control element overriding the first control element when the maximum current is reached. If a short-circuit occurs for example, the breakdown of voltage between the DC voltage leads results in a signal which passes through the band-pass filter and of course has the effect of amplifying the current. Since, for this event, a second control element is present which can override the first control element, such control operation is avoided.

Also, a third control element can be provided which can be acted upon in such a way, by a voltage-control signal derived from the voltage between the two DC leads, that an adjustable voltage is kept constant, the third control element being connected, on the one hand, to one of the ends of the band-pass filter and, on the other hand, to the common reference point. Although a voltage adjusting arrangement of this kind is known, the connection with the rest of the switching system leads to a very simple construction.

Furthermore, the control elements can take the form of difference amplifiers, the output of each of which is connected, by way of a diode, to the input of a control apparatus for the DC-voltage supply means. That difference amplifier that passes the greatest or smallest control signal at a particular time takes over the control of the DC-voltage supply means, whereas each of the other control elements is disconnected.

Figure 2:
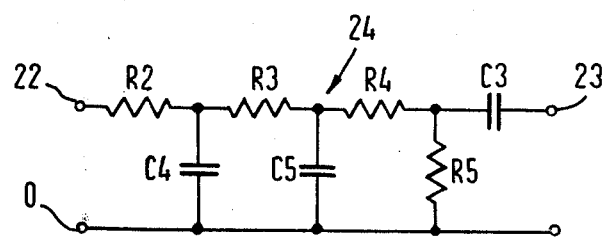
Figure 3:
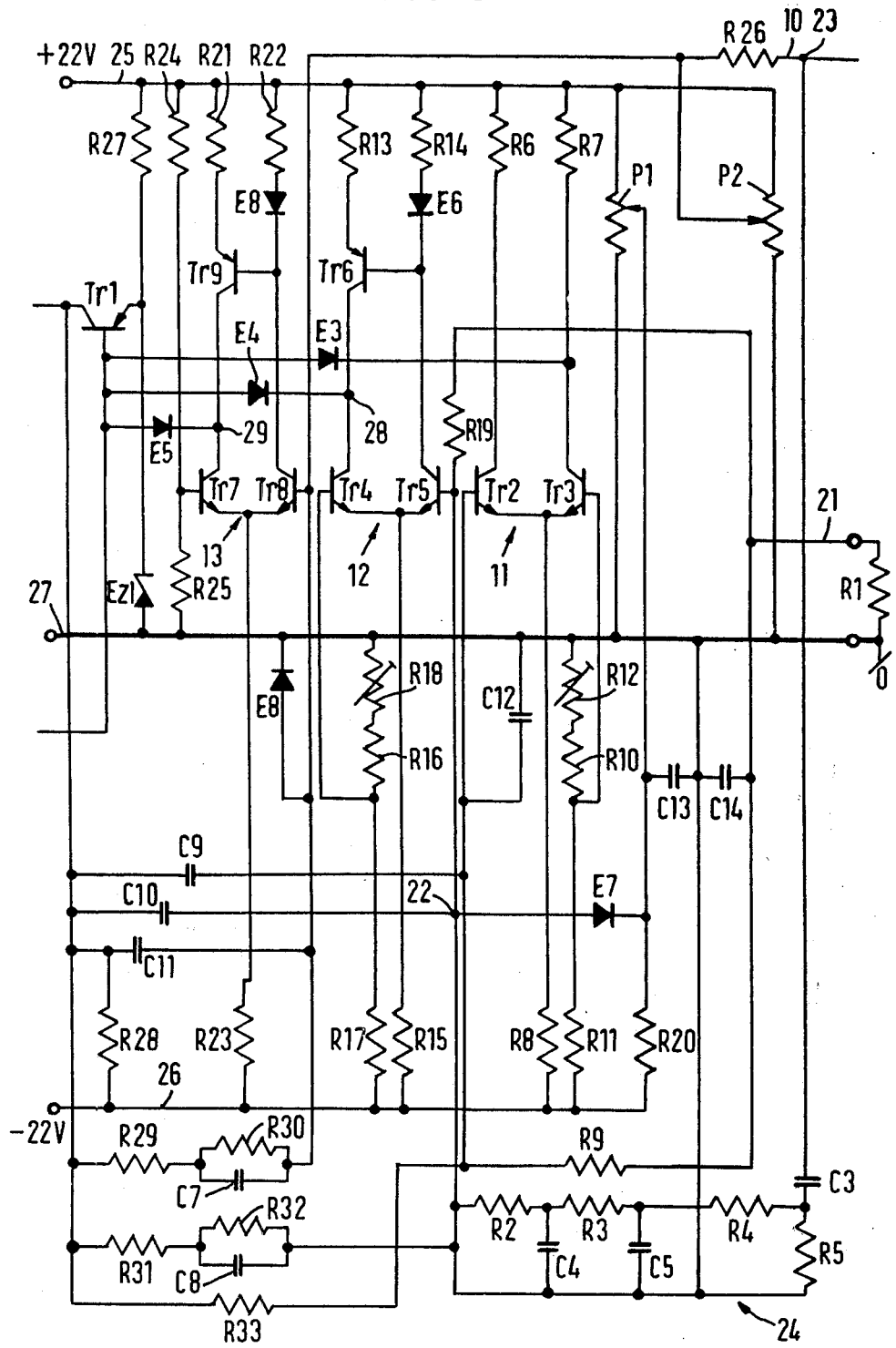

The invention will now be described in greater detail by reference to arrangements illustrated in the annexed drawing, in which:

FIG. 1 is a diagrammatic illustration of an inverter with a DC-voltage supply means and a control circuit arrangement, FIG. 2 shows a form of a band-pass filter that may be used, and FIG. 3 illustrates a form of the control elements used in the control circuit arrangement.

The DC-voltage part of an inverter is connected across the terminals 1 of a three-phase network by way of a three-phase rectifier bridge 2 with a smoothing condenser C1. The inverter has a DC-voltage supply means which incorporates an electronic switch 3, which is actuated in dependence upon a control device 4 in such a way that the width or frequency of the DC voltage pulses, allowed to pass through by the electronic switch 3, can be varied. An arrangement of this kind is known. A positive DC voltage lead 5 and a negative DC voltage lead 6 are provided. A smoothing choke L1 and, downstream thereof, a current-measuring resistor R1 are provided in the positive DC-lead. Between this choke and this resistor is a tapping for a reference potential 0. A smoothing condenser C2 is connected between the two leads 5 and 6 and in series with a parallel arrangement consisting of a resistor R2 and a diode E1. A further, counter-connected, diode E2 is provided in a parallel line upstream of the choke L1. The two leads feed an inverter 7 which in turn supplies current to a three-phase motor 8. The operating frequency supplied to the inverter 7 is fixed by a control device 9 which is fed in dependence upon the actual voltage between the two leads 5 and 6, since it is connected, on the hand, to the negative lead 6 through a connecting lead 10, and on the other hand to the positive lead 5 through the reference potential 0.

Three control elements 11, 12 and 13 are provided and each of these has a comparator 14, 15 and 16 respectively and an amplifier 17, 18 and 19 respectively, and is connected, by way of a diode E3, E4, and E5 respectively, to a lead 20 running to the control device 4 for controlling the voltage U to be supplied to the inverter 7. Each amplifier is connected to the reference potential 0. A connecting lead 21 joined to the positive lead 5 runs on the one hand to the control element 11 and on the other hand to the control element 12. Both control elements are therefore influenced by the voltage-drop at the current-measuring resistor R1. The control element 13 is connected through the connecting lead 10. It is therefore acted upon by the actual voltage between the leads 5 and 6.

Also, a sensor 24 is connected between the point 22 of the connecting lead 21 and the point 23 of the connecting lead 10; when an AC-voltage component occurs between the leads 5 and 6, this sensor lets through signals and additionally influences the control element 12.

FIG. 2 illustrates a form of construction of the sensor 24. Here the sensor is a band-pass filter with three series resistors R2, R3 and R4 and a series condenser C3, as well as two parallel condenser C4 and C5 and a parallel resistor R5. In this system the group consisting of the elements R3, C4, R4 and C5 form a low-pass filter, and the group comprising the elements R5 and C3 constitute a high-pass filter. Therefore, DC voltage and low frequencies, as well as high frequencies are prevented from passing through the filter 25 which however opens for a medium frequency range.

The switching arrangement described thus far can be operated in either of two ways:

a. By introducing a corresponding reference potential at the comparator 16, the control device 4 is so actuated that a certain voltage, with which the motor 8 is to be driven, exists between the leads 5 and 6. The frequency f follows this voltage. Changes in speeds of revolution and therefore changes in voltage are achieved by varying the reference potential at the comparator 16. The voltage at the amplifier 19 is such that the two diodes E3 and E4 are blocked.

b. By setting reference potential at the comparator 15, the control device 4 is so adjusted that the current through the current-measuring resistor R1 and therefore the current supplied to the motor 8 are constant. With changes in the load and therefore a change in the current, the voltage is adjusted in such a way through the amplifier 18 and the DC-voltage supply means that the current again assumes the value to which it has been set. As a consequence of the change in voltage there also occurs a change in frequency and therefore a change in the speed of the motor. In these cases, the motor-torque remains constant. In all these cases the voltage at the amplifier 18 is such that the diodes E3 and E5 are blocked.

If a motor 8 having a certain speed, particularly a super synchronous speed, is driven fluctuations in the motor speed can occur if there are any disturbances or changes in the control circuit. When this happens, energy flows backwards and forwards between the filter circuit and the motor, i.e. particularly between the resistor R2 and the condenser C2 on the one hand and the motor on the other. This has the effect of superimposing, upon the DC voltage between the supply leads 5 and 6, an AC-voltage component, the frequency of which is substantially constant and which is mainly determined by the components L1, R2 and C2 of the filter circuit. This AC voltage cannot be directly determined at the resistor R1; this resistor picks up the AC-voltage component firstly in the form of a current after a phase displacement. This means that readjustment through the control element 18 would not take place at the correct moment. Because of the use of the sensing device 24 however, the AC-voltage component, occurring when there is instability between the leads 5 and 6, is determined and, through this sensing device, is applied to the input of the control element 18 in such a way that feed-back occurs which balances out the AC-voltage component. A stable system is obtained by suitable choice of the amplitude of the AC-voltage component fed back in this way.

By suitably selecting a reference potential supplied to the comparator 14, the control element 11 is so set that when a predetermined maximum current, determined by a voltage-drop at the current-measuring resistor R1, is exceeded, the control device 4 downwardly adjusts the DC voltage to such an extent that this maximum current is not substantially exceeded. In this case the voltage at the amplifier 17 is such that the diodes E4 and E5 are blocked.

The control element 11 therefore also overrides the control element 12; this is important for the following reason. If there is a short-circuit between the leads 5 and 6 and the voltage suddenly collapses, the sensor 24 lets through a control signal which tends to increase the voltage between the leads 5 and 6. This has particularly to be avoided however, and the effect of the control element 11 is to prevent such increase in voltage.

FIG. 3 illustrates how the various control elements may be connected. Here, numerous details have been omitted which, although necessary for providing the required mode of operation, are not essential for understanding the invention. A positive supply lead 25 carrying 22V, a negative supply lead 26, carrying −22 V, and a neutral lead 27 which carries the reference potential of 0 V, are provided. Only the input transistor Tr1 of the control device 4 is illustrated.

The control element 11 comprises a difference amplifier with two transistors Tr2 and Tr3, the first of these having a collector resistor R6 and the second a collector resistor R7, and the two transistors having a common emitter resistor R8. The connecting lead 21 is connected to the base of the transistor Tr2 through a resistor R9. The base of the transistor Tr3 is connected to a voltage divider consisting of two fixed resistors R10 and R11 and a setting resistor R12. The diode E3 is connected to the collector of the transistor Tr3. This control element 11 reacts as soon as the voltage-drop at the current-measuring resistor R1 exceeds a value which is greater than the voltage-drop at the resistors R10 and R11.

The control element 12 consists of a difference amplifier with two transistors Tr4 and Tr5. Connected in the collector branch of the transistor Tr4 is the emitter-collector path of a transistor Tr6 and a resistor R13, and in the collector branch of the transistor Tr5 there are connected a temperature-equalizing diode E6 and a resistor R14. The base of the transistor Tr6 is connected to the collector of the transistor Tr5. An emitter resistor R15 is common to the two transistors of this difference amplifier. The base of the transistor Tr4 is connected to a voltage divider which consists of two fixed resistors R16 and R17 and a setting resistor R18. The base of the transistor Tr5 is connected to the connecting lead 21 through a resistor R19, and to the negative supply lead 26 through a diode E7 and a resistor R20. The band-pass filter, i.e. the sensing device 24, is connected between the point 22 and the point 23. The diode E4 is connected to a junction 28 on the collector of the transistor Tr4. A first setting potentiometer P1 is connected between the leads 25 and 27. The tap of this potentiometer P1 is connected to the cathode of the diode E7, and displacement of the tap permits the potentiometer to move the control element 12 into and out of operation and to set the required constant current.

In the normal case, a certain voltage is established at the base of the transistor Tr5 when a certain current is passing through the current-measuring resistor R1, because of the voltage-drop occurring at that resistor and because of the presence of the resistors R19 and R20. A voltage determined by the voltage divider R16, R17, R18 occurs at the base of the transistor Tr4. Changes in the current through the current-measuring resistor R1 lead to a corresponding adjustment of the control device 4 such that the current through the current-measuring resistor R1 is restored to that value set by the resistor R18.

If an AC-voltage component occurs between the leads 5 and 6 on account of instability in the control circuit, the sensing device 24, in the form of a band-pass filter, lets through current, so that another feed-back voltage, the inverse of the voltage-change between the leads 5 and 6, is established at the base of the transistor Tr5. In this way tendencies towards instability are offset.

The control element 13 has a difference amplifier which has two transistors Tr7 and Tr8. The emitter-collector path of the transistor Tr9 and an associated resistor R21 are disposed in the collector branch of the transistor Tr7, and a temperature-equalizing diode E8 and a resistor R22 are disposed in the collector branch of the transister Tr8. The base of the transistor Tr9 is connected to the collector of the transistor Tr8. The transistors Tr7 and Tr8 have a common emitter resistor R23. The base of the transistor Tr7 is connected to a voltage divider having fixed resistors R24 and R25. The base of the transistor Tr8 is connected to the connecting lead 10 through a resistor R26, and to the reference lead 27 through a diode E8. Smaller resistors, as customarily used for compensating slip and start-up, can be connected into the connecting lead 10. If the voltage in the negative lead 6 deviates from the value set by means of the setting resistor R25, a corresponding readjustment takes place through the diode E5. A second potentiometer P2 is connected between the leads 25 and 27. Its tap is connected to the lead 10 beyond the resistor R26. By adjusting this tap, the control element 13 for regulating the voltage can be brought into and out of operation. Furthermore, the required voltage can be thereby set.

The input of the control device 4, i.e. of the transistor Tr1, receives through its emitter a voltage determined by a Zener diode Ez1 and is connected to a further resistor R27. The three diodes E3, E4 and E5 are connected to the base of this transistor, the other connection points of which are not illustrated. The collector is connected through a resistor R28 to the negative supply lead 26. Also, return paths are provided between the collector and the various control elements 11 to 13. A network consisting of a series resistor R29 and the parallel arrangement comprising a condenser C7 and a resistor R30 connects the collector to the base of the transistor Tr8 of the control element 13. A network consisting of a series resistor R31 and a parallel arrangement comprising a condenser C8 and a resistor R32 connects the collector to the base of the transistor Tr5 of the control element 12. A resistor R33 connects to collector to the base of the transistor Tr2 of the control element 11. In additon, decoupling condensers C9, C10, C11, C12, C13 and C14 are provided between the various leads.

We claim:

1. In a DC supply circuit for supplying a DC voltage to an inverter driving a motor, said DC supply circuit comprising
an electronic switch, a control device adapted to switch said electronic switch on and off to provide a pulsed DC output,
a filter connected to said electronic switch to smooth said pulsed DC output to provide on a pair of leads said DC voltage to be supplied to said inverter,
and a current sensor connected to sense the DC current supplied to said inverter and operative to cause said control device to control switching of said electronic switch in such a manner as to keep said current constant; the improvement
comprising an AC voltage sensor connected between said pair of leads and
a control element connected to said AC voltage sensor and to said control device and responsive to detection by the voltage sensor of an AC voltage component between said pair of leads to over-ride said constant current operation of said electronic switch provided by said control device and to cause said control device to control switching of said electronic switch in such a manner as to vary said DC voltage on said pair of leads to counteract said AC voltage component on the pair of leads.

2. A DC supply circuit according to claim 1 wherein the AC voltage sensor is a band-pass filter.

3. A DC supply circuit according to claim 2 wherein said band-pass filter comprises a low-pass filter and a high-pass filter connected in series.

4. A DC supply circuit according to claim 1 wherein said control element has a first input connected to said current sensor and a second input for a reference voltage, the element being responsive to the current sensor during normal operation of the DC supply circuit to provide an output signal to said control device to cause said device to control switching of said electronic switch in such a manner as to keep said DC current constant, and responsive to detection by said AC voltage sensor of said AC voltage component on said pair of leads to modify said output signal to cause said control device to control switching of said electronic switch in such a manner as to vary said DC voltage on the pair of leads to counteract said AC voltage component.

5. A DC supply circuit according to claim 4 wherein said AC voltage sensor is a band-pass filter, said current sensor is a resistor connected in one of said pair of leads so that said DC current supplied to the inverter passes therethrough to produce a voltage thereacross representative of said current, one end of said resistor is connected to said band-pass filter and to said control element to establish a common reference potential point, the other end of said resistor is connected to said first input of said control element, and the other of said pair of leads is connected to said control element via said band-pass filter.

6. A DC supply circuit according to claim 5 wherein a further control element is provided, said element being connected to one end of said band-pass filter and to said common reference potential point so as to be responsive to the DC voltage between said pair of leads to cause said control device to control switching of said electronic switch in such a manner as to keep said voltage constant.

7. A DC supply circuit according to claim 6 wherein said further control element comprises a differential amplifier having an output connected by a diode to an input of said control device.

8. A DC supply circuit according to claim 1 wherein a second control element is connected in parallel with the first-mentioned control element to said current sensor and to said control device, said second control element being responsive to said DC current supplied to said inverter attaining a predetermined, adjustable maximum value to over-ride operation of the first-mentioned control element.

9. A DC supply circuit according to claim 8 wherein said second control element comprises a differential amplifier having an output connected by a diode to an input of said control device.

10. A DC supply circuit according to claim 1 wherein said control element comprises a differential amplifier having an output connected by a diode to an input of said control device.

* * * * *